US008959891B2

(12) United States Patent
Fukuoka et al.

(10) Patent No.: US 8,959,891 B2
(45) Date of Patent: Feb. 24, 2015

(54) SELECTIVE CATALYTIC REDUCTION SYSTEM (75) Inventors: Takeshi Fukuoka, Fujisawa (JP); Hirotaka Takahashi, Fujisawa (JP); Tomoo Nishikawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 304 days.

(21) Appl. No.: 13/699,495

(22) PCT Filed: May 16, 2011

(86) PCT No.: PCT/JP2011/061214
§ 371 (c)(1),
(2), (4) Date: Nov. 21, 2012

(87) PCT Pub. No.: WO2011/148811
PCT Pub. Date: Dec. 1, 2011

(65) Prior Publication Data
US 2013/0064716 A1 Mar. 14, 2013

(30) Foreign Application Priority Data
May 25, 2010 (JP) .................... 2010-119715

(51) Int. Cl.
F01N 3/10 (2006.01)
F01N 3/00 (2006.01)
F01N 9/00 (2006.01)
F01N 11/00 (2006.01)
F01N 3/18 (2006.01)
F01N 3/20 (2006.01)

(52) U.S. Cl.
CPC ............ *F01N 3/18* (2013.01); *F01N 3/208* (2013.01); *F01N 2610/02* (2013.01); *F01N 2610/1406* (2013.01); *Y02T 10/24* (2013.01)
USPC ............ 60/277; 422/168; 422/106; 422/172; 60/272; 60/282; 60/287; 60/299; 60/301

(58) Field of Classification Search
None
See application file for complete search history.

(56) References Cited

U.S. PATENT DOCUMENTS

2010/0086446 A1* 4/2010 Matsunaga et al. ........... 422/106

FOREIGN PATENT DOCUMENTS

JP 2000-303826 10/2000
(Continued)

OTHER PUBLICATIONS

Written Opinion of the International Searching Authority mailed Jul. 12, 2011 in corresponding International Application No. PCT/JP2011/061214.
International Search Report of Corresponding PCT Application PCT/JP2011/061214 mailed Jul. 12, 2011.
Patent Abstracts of Japan, Publication No. 2006-220109, Published Aug. 24, 2006.
Patent Abstracts of Japan, Publication No. 2010-007568, Published Jan. 14, 2010.

(Continued)

*Primary Examiner* — Walter D Griffin
*Assistant Examiner* — Jelitza Perez
(74) *Attorney, Agent, or Firm* — Staas & Halsey LLP (57) ABSTRACT A selective catalytic reduction (SCR) system that can detect whether or not a float is stuck even where a water level sensor that detects a liquid level in a stepwise manner is used, including: an urea injection quantity integrating unit that integrates an injected quantity of urea to calculate an urea injection quantity integrated value; an integrated value resetting unit that, if a detected value from detection means changes, resets the urea injection quantity integrated value; and an abnormality determination unit that, if the urea injection quantity integrated value exceeds a predetermined threshold value for determination, determines a level sensor as having an abnormality.

2 Claims, 7 Drawing Sheets

(56) References Cited

FOREIGN PATENT DOCUMENTS

| | | |
|---|---|---|
| JP | 2006-220109 | 8/2006 |
| JP | 2007-155705 | 6/2007 |
| JP | 2010-7568 | 1/2010 |
| WO | WO 2009/110269 A1 | 9/2009 |

OTHER PUBLICATIONS

Patent Abstracts of Japan, Publication No. 2007-155705, Published Jun. 21, 2007.
Patent Abstracts of Japan, Publication No. 2000-303826, Published Oct. 31, 2000.

* cited by examiner

SELECTIVE CATALYTIC REDUCTION SYSTEM

CROSS-REFERENCE TO RELATED APPLICATIONS

This application claims the benefit of Japanese Patent Application No. 2010-119715, filed on May 25, 2010, the contents of which is incorporated herein by reference, which serves as priority for PCT Application No. PCT/JP2011/061214, filed May 16, 2011.

TECHNICAL FIELD

The present invention relates to an SCR system that reduces $NO_x$ in an exhaust gas from an engine using urea, and specifically relates to an SCR system that includes a float-type urea level sensor and diagnoses whether a float in the urea level sensor is stuck.

BACKGROUND ART

As an exhaust gas $NO_x$ reduction system for reducing $NO_x$ in an exhaust gas from a diesel engine, an SCR system using a selective catalytic reduction device (hereinafter referred to as SCR (selective catalytic reduction) device) has been developed.

The SCR system supplies urea stored in a urea tank to an exhaust gas upstream of the SCR device to generate ammonia, and using the ammonia, reduces $NO_x$ on an SCR catalyst to reduce $NO_x$ (see, for example, patent literature 1).

In an SCR system, when there is a small or no remaining quantity of urea stored in a urea tank, the urea injection quantity is limited or urea injection is stopped. If a vehicle is run in such state, $NO_x$ in the exhaust gas is emitted to the atmosphere without being reduced. Therefore, in a vehicle with an SCR system installed therein, when there is a small or no remaining quantity of urea stored in an urea tank, control is performed to provide a speed limit or regulate (or prohibit) an engine start.

The remaining quantity of urea stored in the urea tank is detected by a urea level sensor provided in the urea tank. For the urea level sensor, a float-type level sensor that includes a float following a liquid surface of urea and detects a position of the float to measure a liquid level of urea in the urea tank is used.

In the float-type level sensor, if a float is immobilized due to any reason, the liquid level cannot be detected. Also, since a liquid level of urea (that is, a remaining quantity of urea), which is a value detected by the urea level sensor, is used for control to provide a speed limit and/or an engine start limit, the urea level sensor may be subjected to an action called tampering in which a float is intentionally fixed to make urea that does actually not remain, seem to remain in order to avoid these limits. Accordingly, there is a need for a diagnosis of whether or not a float is stuck to detect an abnormality (failure) of the level sensor if the float is immobilized or the float is intentionally fixed.

For conventional diagnoses of whether or not a float is stuck, for example, for fuel level sensors that detect a liquid level of a fuel in a fuel tank, a method in which a used quantity of fuel is calculated from a running distance and a fuel quantity obtained from a change in value detected by the fuel level sensor, and if there is a large difference between the fuel quantity obtained from the change in value detected by the fuel level sensor and the fuel quantity obtained from the running distance, it is determined that the fuel level sensor has an abnormality (that is, a float is stuck) is known (see, for example, patent literature 2).

CITATION LIST

Patent Literature

Patent Literature 1: Japanese Patent Laid-Open No. 2000-303826
Patent Literature 2: Japanese Patent Laid-Open No. 2006-220109

SUMMARY OF INVENTION

Technical Problem

However, urea is not consistently injected while the vehicle is running, and also, the injection quantity varies depending on the quantity of $NO_x$ emitted from the engine. Accordingly, an injected quantity of urea cannot be calculated from a running distance, and thus, it is difficult to apply the conventional diagnosis of whether or not a float is stuck in a fuel level sensor to a urea level sensor as it is.

In the conventional diagnosis of whether or not a float is stuck in a fuel level sensor, it is assumed that a level sensor that successively detects a liquid level is used, and if a level sensor that detects a liquid level in a stepwise manner is employed, whether or not a float is stuck may be unable to be detected.

Therefore, an object of the present invention is to solve the above problem and provide an SCR system that can detect whether or not a float is stuck even where a urea level sensor that detects a liquid level in a stepwise manner is used.

Solution to Problem

The present invention has been made in order to achieve the above object, and provides an SCR system including: a selective catalytic reduction device provided in an exhaust pipe for an engine; a urea tank that stores urea; a float-type urea level sensor provided in the urea tank, the float-type urea level sensor including a float following a liquid surface of the urea in the urea tank, and detection means for detecting a position of the float to detect a liquid level of the urea stored in the urea tank; and a urea injection control unit that controls an injected quantity of urea, according to a quantity of $NO_x$ emitted from the engine, wherein the SCR system includes: a urea injection quantity integrating unit that integrates the injected quantity of urea to calculate a urea injection quantity integrated value; an integrated value resetting unit that if a detected value from the detection means changes, resets the urea injection quantity integrated value; and an abnormality determination unit that if the urea injection quantity integrated value exceeds a predetermined threshold value for determination, determines the urea level sensor as having an abnormality.

It is possible that: the detection means in the urea level sensor is configured to detect the liquid level of the urea stored in the urea tank in a stepwise manner; and the threshold value for determination is set to a value exceeding a quantity of urea corresponding to at least one step in steps of the liquid level of the urea detected by the detection means.

Advantageous Effects of Invention

The present invention enables detection of whether or not a float is stuck even where a urea level sensor that detects a liquid level in a stepwise manner is used.

DESCRIPTION OF EMBODIMENT

A preferred embodiment of the present invention will be described below with reference to the attached drawings.

First, an SCR system to be installed in a vehicle will be described.

Figure 1A:
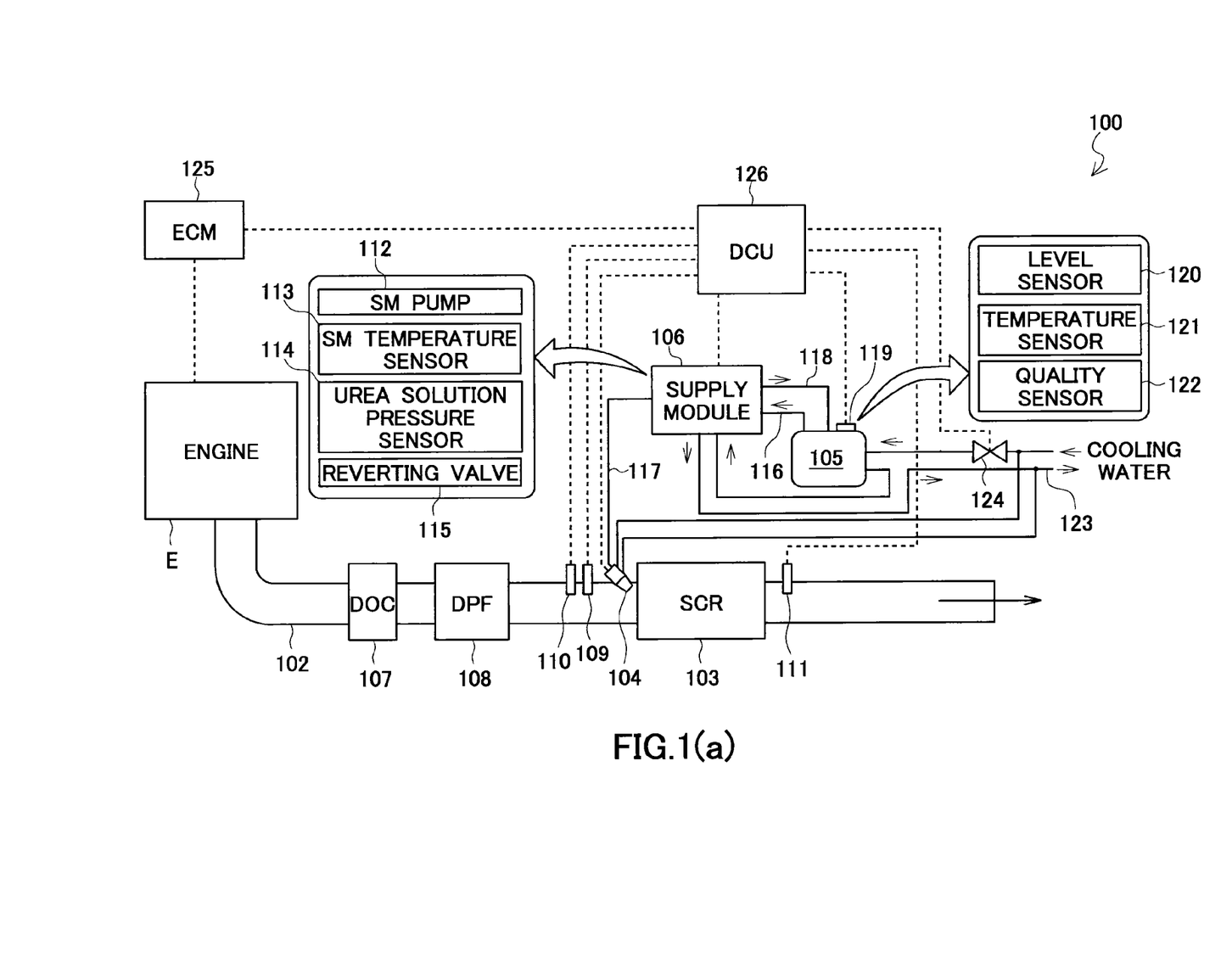
FIGS. 1(a) and 1(b) are diagrams each illustrating a schematic configuration of an SCR system according to the present embodiment.

As illustrated in FIG. 1(a), an SCR system 100 mainly includes: an SCR device 103 provided in an exhaust pipe 102 for an engine E; a dosing valve (urea injection device or dosing module) 104 that injects urea on the upstream side of the SCR device 103 (upstream side of an exhaust gas); a urea tank 105 that stores urea; a supply module 106 that supplies urea stored in the urea tank 105 to the dosing valve 104 and a DCU (dosing control unit) 126 that controls, e.g., the dosing valve 104 and the supply module 106.

In the exhaust pipe 102 for the engine E, a DOC (diesel oxidation catalyst) 107, a DPF (diesel particulate filter) 108 and the SCR device 103 are sequentially disposed from the upstream side to the downstream side of an exhaust gas. The DOC 107 is provided to oxidize NO in an exhaust gas emitted from the engine E to $NO_2$ to control a ratio between NO and $NO_2$ in the exhaust gas for enhancement in denitration efficiency of the SCR device 103. Also, the DPF 108 is provided to collect PM (particulate matter) in the exhaust gas.

In the exhaust pipe 102 on the upstream side of the SCR device 103, the dosing valve 104 is provided. The dosing valve 104 has a structure in which a cylinder filled with high-pressure urea is provided with an injection orifice and a valving element occluding the injection orifice is attached to a plunger, and upon energization of a coil to pull up the plunger, the valving element is moved away from the injection orifice, whereby urea is injected. Upon the energization of the coil being stopped, the plunger is pulled down by means of an internal spring force so that the valving element occludes the injection orifice, whereby the injection of urea is stopped.

In the exhaust pipe 102 on the upstream side of the dosing valve 104, an exhaust temperature sensor 109 that measures a temperature of an exhaust gas at an entrance of the SCR device 103 (SCR entrance temperature) is provided. Also, on the upstream side of the SCR device 103 (here, the upstream side of the exhaust temperature sensor 109), an upstream side $NO_x$ sensor 110 that detects an $NO_x$ concentration on the upstream side of the SCR device 103 is provided, and on the downstream side of the SCR device 103, a downstream side $NO_x$ sensor 111 that detects an $NO_x$ concentration on the downstream side of the SCR device 103 is provided.

The supply module 106 includes: an SM pump 112 that pressure-feeds urea; an SM temperature sensor 113 that measures a temperature of the supply module 106; a urea pressure sensor 114 that measures a pressure of the urea in the supply module 106 (pressure on the discharge side of the SM pump 112); and a reverting valve 115 that switches between supply of urea from the urea tank 105 to the dosing valve 104 and return of urea in the dosing valve 104 to the urea tank 105 by switching between flow passages of urea. Here, arrangement is made so that when the reverting valve 115 is off, the urea from the urea tank 105 is supplied to the dosing valve 104 and when the reverting valve 115 is on, the urea in the dosing valve 104 is returned to the urea tank 105.

When switching of the reverting valve 115 is made so that urea is supplied to the dosing valve 104, the supply module 106 sucks up urea in the urea tank 105 through a liquid feed line 116 via the SM pump 112 and supplied to the dosing valve 104 through a pressure-feed line 117 and extra urea is returned to the urea tank 105 through a collection line 118.

In the urea tank 105, an SCR sensor 119 is provided. The SCR sensor 119 includes: a urea level sensor (hereinafter simply referred to as level sensor) 120 that measures a liquid level of urea in the urea tank 105; a temperature sensor 121 that measures a temperature of the urea in the urea tank 105; and a quality sensor 122 that measures a quality of the urea in the urea tank 105. The quality sensor 122 is configured to detect a concentration of urea and/or whether a heterogeneous mixture is mixed in the urea, based on, for example, an ultrasound propagation speed and/or electrical conductivity to detect a quality of the urea in the urea tank 105.

The level sensor 120 is configured to detect a liquid level of urea stored in the urea tank 105 in a stepwise manner (discretely). Details of the level sensor 120 will be described later.

A cooling line 123 that circulates cooling water for cooling the engine E is connected to the urea tank 105 and the supply module 106. The cooling line 123 runs through the inside of the urea tank 105 for heat exchange between cooling water flowing in the cooling line 123 and urea in the urea tank 105. Likewise, the cooling line 123 runs through the inside of the supply module 106 for heat exchange between the cooling water flowing in the cooling line 123 and urea in the supply module 106.

In the cooling line 123, a tank heater valve (coolant valve) 124 that provides a switch for whether or not cooling water is supplied to the urea tank 105 and the supply module 106 is provided. Although the cooling line 123 is connected also to the dosing valve 104, arrangement is made so that cooling water is supplied to the dosing valve 104 irrespective of whether the tank heater valve 124 is opened or closed. The cooling line 123 is disposed along the liquid feed line 116, the pressure-feed line 117 and the collection line 118 through which urea passes, which is, however, not illustrated in FIG. 1(a) for simplification of the Figure.

Figure 2:
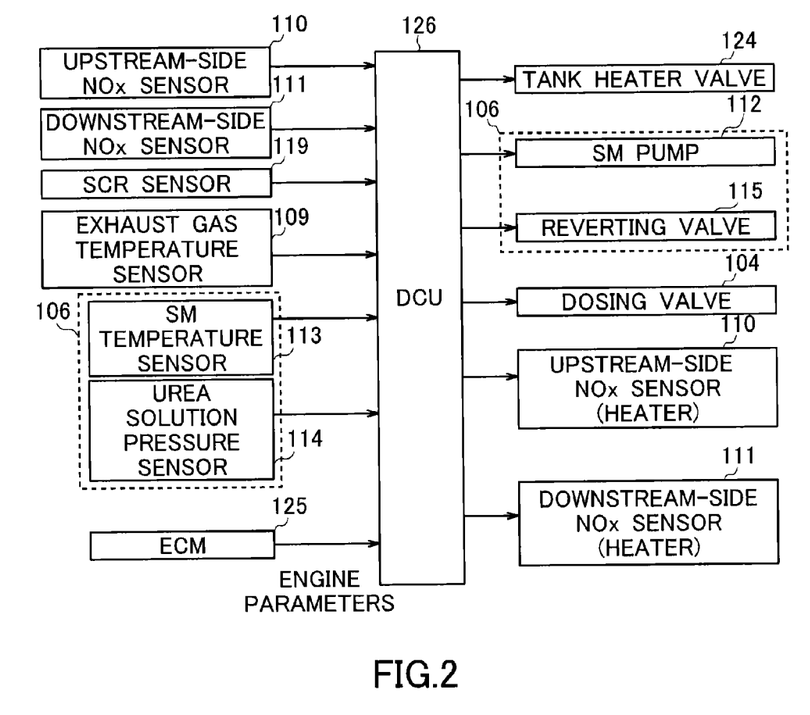
FIG. 2 is a diagram of an input/output configuration of a DCU in the SCR system in FIG. 1.

FIG. 2 is a diagram of an input/output configuration of the DCU 126.

As illustrated in FIG. 2, input signal lines from the upstream-side NO sensor 110, the downstream-side $NO_x$ sensor 111, the SCR sensor 119 (the level sensor 120, the temperature sensor 121 and the quality sensor 122), the exhaust temperature sensor 109, the SM temperature sensor 113 and the urea pressure sensor 114 in the supply module 106 and an ECM (engine control module) 125 that controls the engine E are connected to the DCU 126. From the ECM 125, signals for engine parameters (e.g., engine rotation speed) are input.

Also, output signal lines to the tank heater valve 124, the SM pump 112 and the reverting valve 115 in the supply module 106, the dosing valve 104, a heater for the upstream-side $NO_x$ sensor 110 and a heater for the downstream-side $NO_x$ sensor 111 are connected to the DCU 126. Here, input/ output of signals between the DCU 126 and the respective members may be made via the individual signal lines or a CAN (controller area network).

A urea injection control unit 127 that controls an injected quantity of urea according to a quantity of $NO_x$ emitted from the engine is installed in the DCU 126. The urea injection control unit 127 is configured to estimate a quantity of $NO_x$ in an exhaust gas based on the signals for the engine parameters from the ECM 125 and a temperature of the exhaust gas from the exhaust temperature sensor 109 and determine a quantity of urea to be injected from the dosing valve 104 based on the estimated quantity of $NO_x$ in the exhaust gas, and furthermore, when the determined quantity of urea is injected via the dosing valve 104, controls the dosing valve 104 based on a value detected by the upstream-side $NO_x$ sensor 110 to adjust the quantity of urea injected via the dosing valve 104.

Here, the level sensor 120 will be described with reference to FIGS. 3 to 6.

Figure 3:
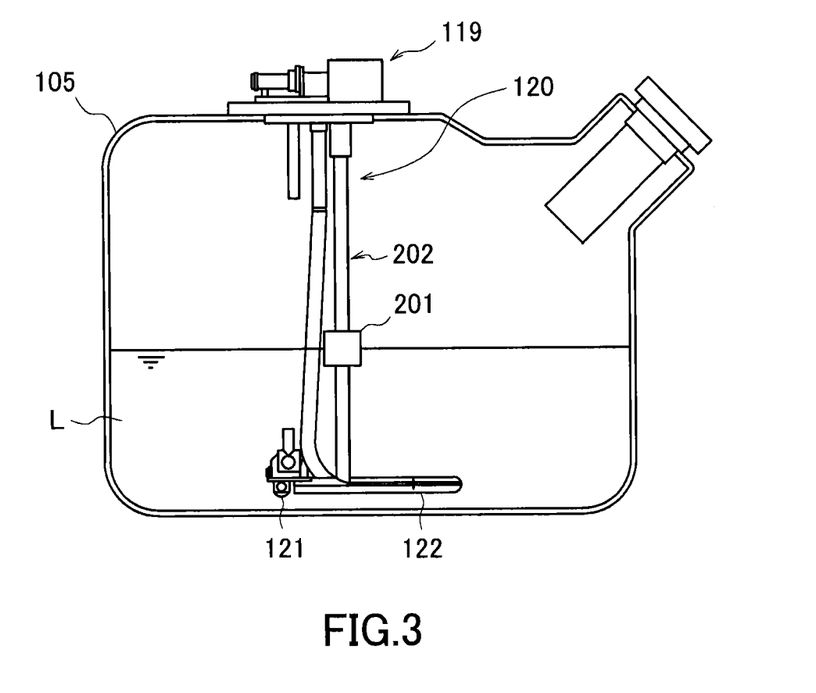
FIG. 3 is a cross-sectional view of a urea tank in the present invention.
Figure 4:
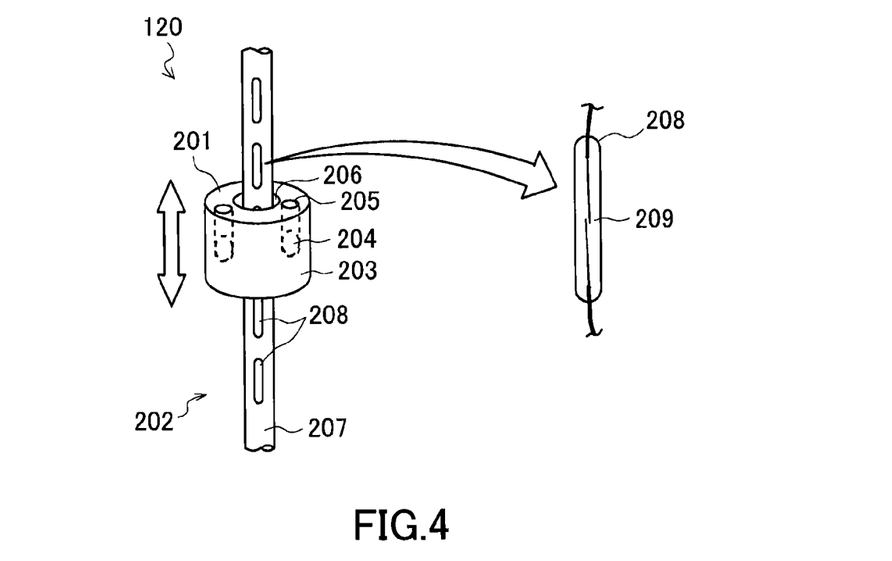
FIG. 4 is a diagram illustrating a urea level sensor in the present invention.

As illustrated in FIGS. 3 and 4, the level sensor 120 includes a float 201 following a liquid surface of urea L in the urea tank 105, and detection means 202 that detects a position (height position) of the float 201 to detect a liquid level of the urea L stored in the urea tank 105 in a stepwise manner.

The float 201 includes a float body 203 having a hollow cylindrical shape, and magnets 204 attached to the float body 203. The magnets 204 are received in respective recess slots 205 formed in the float body 203.

The detection means 202 is inserted through a hollow portion 206 of the float body 203, and includes a pipe 207 vertically arranged in the urea tank 105 and reed switches 208 provided at predetermined intervals in a longitudinal direction of the pipe 207, each of reed switches 208 including a contact 209 that is closed by a magnetic force of the magnets 204 attached to the float body 203, and the detection means 202 detects a reed switch 208 with its contact 209 closed to detect a position (height position) of the float 201.

Figure 5:
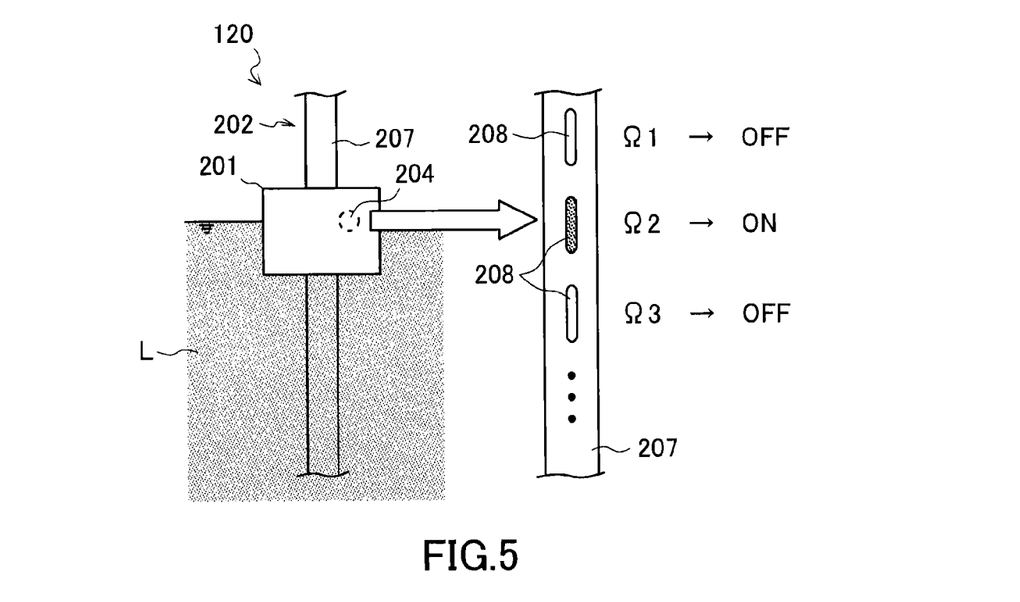
FIG. 5 is a diagram illustrating an operation of a urea level sensor in the present invention.

As illustrated in FIG. 5, the respective reed switches 208 are set to have different resistance values.

As illustrated in FIG. 5, reed switches 208 having a resistance value 121, a resistance value $\Omega 2$, a resistance value $\Omega 3$, . . . are attached from the upper side to the lower side in the vertical direction, and when the float 201 is positioned at the reed switch 208 having the resistance value $\Omega 2$, the contact 209 of the reed switch 208 having the resistance value $\Omega 2$ is closed (i.e., turned on), whereby a signal of a voltage (or current) according to the resistance value $\Omega 2$ is output to the DCU 126.

In the DCU 126, a urea level detection unit 128 that obtains a liquid level of the urea L (i.e., a remaining quantity of the urea L) stored in the urea tank 105, based on the signal (signal of the voltage (or current) according to the resistance value of the reed switch 208 with its contact 209 closed) from the detection means 202.

Figure 1B:
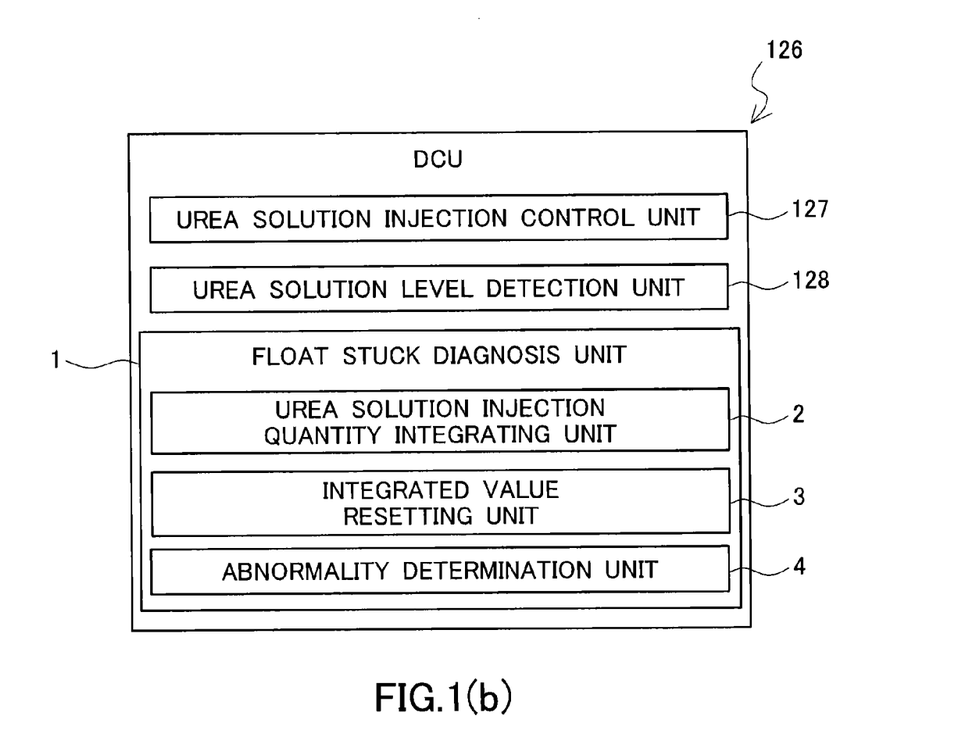

As illustrated in FIG. 1(*b*), the SCR system 100 according to the present embodiment includes: a urea injection quantity integrating unit 2 that integrates an injected quantity of urea L to calculate a urea injection quantity integrated value; an integrated value resetting unit 3 that if a detected value from the detection means 202 changes, resets the urea injection quantity integrated value; and an abnormality determination unit 4 that if the urea injection quantity integrated value exceeds a predetermined threshold value for determination, determines the level sensor 120 as having an abnormality. The urea injection quantity integrating unit 2, the integrated value resetting unit 3 and the abnormality determination unit 4 are collectively referred to as a float stuck diagnosis unit 1. The float stuck diagnosis unit 1 is installed in the DCU 126.

The urea injection quantity integrating unit 2 is configured to integrate an injection quantity of the urea L injected from the dosing valve 104 (injected quantity of the urea L determined by the urea injection control unit 127) to calculate a urea injection quantity integrated value.

Also, the urea injection quantity integrating unit 2 is configured to store a urea injection quantity integrated value at the time of the vehicle being powered off via a key (i.e., an ignition switch being turned off) and at the time of the vehicle being powered on via the key (i.e., the ignition switch being turned on) next, integration of the injected quantity of the urea L is performed so as to continue from the stored urea injection quantity integrated value. In other words, the urea injection quantity integrating unit 2 continues the integration of the injected quantity of the urea L irrespective of whether the ignition switch is on or off.

The integrated value resetting unit 3 is configured to, if a detected value from the detection means 202 changes, that is, the liquid level of the urea L detected by the detection means 202 transitions from a certain step to another step, reset the urea injection quantity integrated value.

The abnormality determination unit 4 is configured to, if the urea injection quantity integrated value is not reset by the integrated value resetting unit 3 (that is, the float 201 does not move) and the urea injection quantity integrated value exceeds a predetermined threshold value for determination, determine the float 201 as being stuck and determine the level sensor 120 as having an abnormality. The abnormality determination unit 4 is configured to, if the abnormality determination unit 4 determines that the level sensor 120 has an abnormality, put on a non-illustrated warning lamp (CEL (check engine lamp) or MIL (malfunction indicator lamp)) to warn a driver.

The threshold value for determination used by the abnormality determination unit 4 is set to a value exceeding a quantity of urea L corresponding to at least one step in steps of the liquid level of the urea L detected by the detection means 202, and preferably, a quantity of urea L corresponding to two or three steps may be set as the threshold value for determination.

Also, the abnormality determination unit 4 conducts a diagnosis of the level sensor 120 only if all of diagnosis permission conditions (1) to (4) below are met.

(1) There are no errors (e.g., timeout or bus-off error) in CAN communications;

(2) A battery voltage is within a predetermined range (for example, 10 to 16 V);

(3) There are no errors in a circuit in the level sensor 120; and (4) The liquid level detected by the level sensor 120 is not in a lowest step.

Next, a control flow for the float stuck diagnosis unit 1 will be described with reference to FIG. 6. The float stuck diagnosis unit 1 is configured to repeatedly execute the control flow in FIG. 6.

Figure 6:
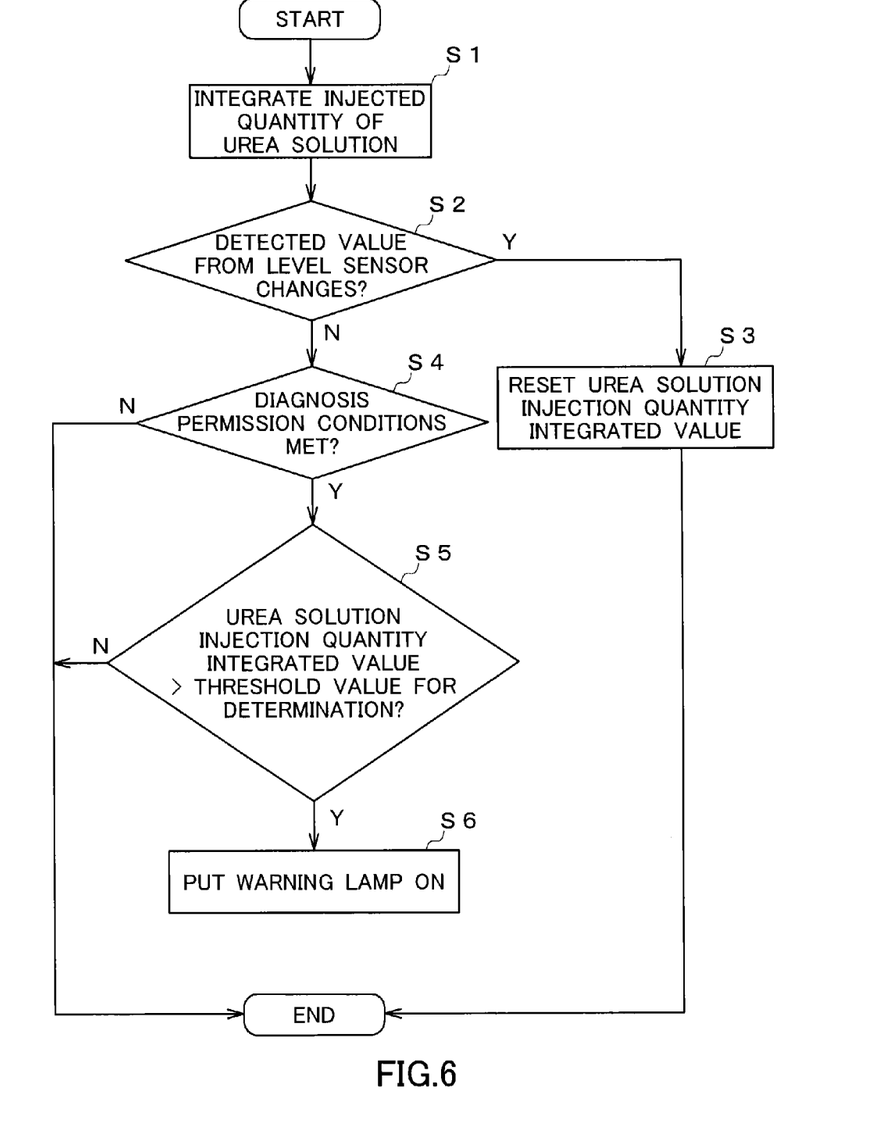
FIG. 6 is a flowchart illustrating a control flow for a float stuck diagnosis unit in the present invention.

As illustrated in FIG. 6, first, in step S1, the urea injection quantity integrating unit 2 integrates an injected quantity of urea L to calculate a urea injection quantity integrated value. The urea injection quantity integrated value is continuously integrated unless the urea injection quantity integrated value is reset.

Subsequently, in step S2, the integrated value resetting unit 3 determines whether or not a value detected by the level sensor 120 changes. In the present embodiment, whether or not the float 201 is stuck is detected, and thus, a change in value detected by the level sensor 120 is not limited to a change resulting from a decrease in remaining quantity of urea L, and may be, for example, a change resulting from the vehicle shaking or a change resulting from the vehicle being inclined on a slope. In other words, the result of determination in step S2 is YES whether the value detected by the level sensor 120 changes in a direction in which the liquid level of the urea L is raised or in a direction in which the liquid level of the urea L is lowered.

If the result of the determination in step S2 is YES, the result means that the float 201 moves, and thus, the float 201 is considered as not being stuck. Accordingly, in step S3, the integrated value resetting unit 3 resets the urea injection quantity integrated value to 0 (zero) and the control is ended.

If the result of the determination in step S2 is NO, in step S4, the abnormality determination unit 4 determines whether or not all of diagnosis permission conditions (1) to (4) above are met. If the result of the determination in step S4 is NO, the level sensor 120 is not diagnosed and the control is ended.

If the result of the determination in step S4 is YES, in step S5, the abnormality determination unit 4 determines whether or not the urea injection quantity integrated value exceeds the threshold value for determination. If the result of the determination in step S5 is NO, the injected quantity of urea is too small to determine whether or not the float 201 is stuck, and thus, the control is ended as it is.

If the result of the determination in step S5 is YES, the result means that the float 201 does not move despite a large injected quantity of urea, and thus, the float 201 can be considered as being stuck. Accordingly, in step S6, the abnormality determination unit 4 determines the level sensor 120 as having an abnormality and puts the warning lamp on.

Figure 7:
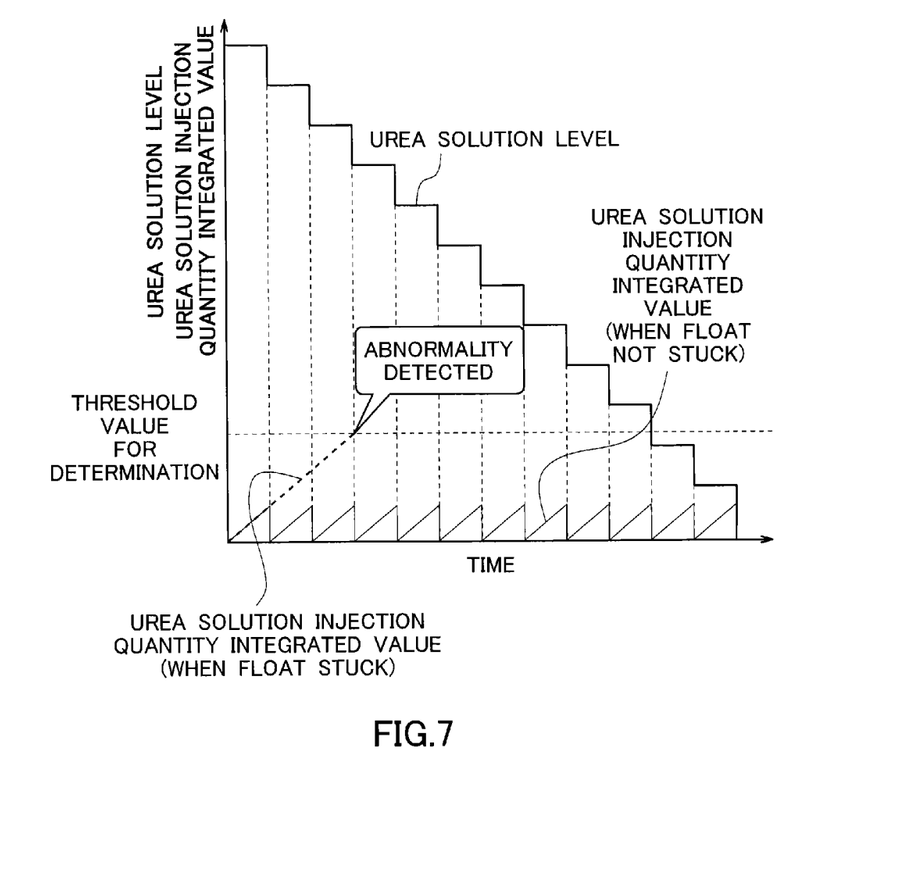
FIG. 7 is a diagram illustrating an operation of a float stuck diagnosis unit in the present invention.

Here, a further detailed description of an operation of the float stuck diagnosis unit 1 will be provided.

As illustrated in FIG. 7, a case where a constant quantity of urea L is continuously injected and the urea level (illustrated bold solid line) is gradually lowered will be discussed. Here, for simplicity, a constant quantity of urea L is continuously injected; however, in reality, an injected quantity of urea L is determined according to a quantity of $NO_x$ emitted from the engine E.

When the float 201 is not stuck, the float 201 moves following the liquid surface of the urea L, and thus, the urea injection quantity integrated value (illustrated thin solid line) is reset each time the float 201 moves from a position corresponding to a current reed switch 208 to a position corresponding to a reed switch 208 below that reed switch 208.

Meanwhile, when the float 201 is stuck, the float 201 does not move, and thus, the urea injection quantity integrated value (illustrated bold dashed line) continuously increases without being reset. If the urea injection quantity integrated value exceeds the threshold value for determination, an abnormality of the level sensor 120 is detected.

As described above, the SCR system 100 according to the present embodiment includes: the urea injection quantity integrating unit 2 that integrates an injected quantity of urea L to calculate a urea injection quantity integrated value; the integrated value resetting unit 3 that if a detected value from the detection means 202 changes, resets the urea injection quantity integrated value; and the abnormality determination unit 4 that if the urea injection quantity integrated value exceeds a predetermined threshold value for determination, determines the level sensor 120 as having an abnormality.

Consequently, even where one that detects a liquid level in a stepwise manner is used as the level sensor 120, it is possible to if the float 201 is immobilized or the float 201 is intentionally fixed, detect that the float 201 is stuck to detect an abnormality (failure) of the level sensor 120.

The present invention is not limited to the above embodiment, and it should be understood that various alterations are possible without departing from the spirit of the present invention.

For example, although the above embodiment has been described in terms of a case where one that detects a liquid level of urea L (remaining quantity of urea L) from a resistance value of a reed switch 208 with its contact 209 closed is used as the level sensor 120, the level sensor according to the present invention is not limited to this and the present invention is applicable to any type of level sensor as long as the level sensor is a level sensor that detects a liquid level in a stepwise manner.

REFERENCE SIGNS LIST

1 float stuck diagnosis unit
2 urea injection quantity integrating unit
3 integrated value resetting unit
4 abnormality determination unit
100 SCR system
102 exhaust pipe
103 SCR device (selective catalytic reduction device)
104 dosing valve
105 urea tank
119 SCR sensor
120 level sensor (urea level sensor)
125 ECM
126 DCU
127 urea injection control unit
128 urea level detection unit
E engine

The invention claimed is:
1. An SCR system including:
a selective catalytic reduction device provided in an exhaust pipe for an engine;
a urea tank that stores urea;
a float-type urea level sensor provided in the urea tank, the float-type urea level sensor including a float following a liquid surface of the urea in the urea tank, and detection means for detecting a position of the float to detect a liquid level of the urea stored in the urea tank; and
a urea injection control unit that controls an injected quantity of urea according to a quantity of $NO_x$ emitted from the engine,
wherein the SCR system comprises:
a urea injection quantity integrating unit that integrates the injected quantity of urea to calculate a urea injection quantity integrated value;
an integrated value resetting unit that if a detected value from the detection means changes, resets the urea injection quantity integrated value; and
an abnormality determination unit that if the urea injection quantity integrated value exceeds a predetermined threshold value for determination, determines the urea level sensor as having an abnormality.
2. The SCR system according to claim 1,
wherein the detection means in the urea level sensor is configured to detect the liquid level of the urea stored in the urea tank in a stepwise manner; and
wherein the threshold value for determination is set to a value exceeding a quantity of urea corresponding to at least one step in steps of the liquid level of the urea detected by the detection means.

* * * * *